(12) United States Patent
Giroud et al.

(10) Patent No.: US 8,568,911 B2
(45) Date of Patent: Oct. 29, 2013

(54) LIQUID ELECTROLYTE STORAGE BATTERY AND METHOD FOR FILLING

(75) Inventors: Nelly Giroud, Grenoble (FR); Pierre Jost, Vizille (FR); Helene Rouault, Le Versoud (FR)

(73) Assignees: Commissariat a l'Energie Atomique et aux Energies Alternatives, Paris (FR); Centre Nationale de Recherche Scientifique, Paris (FR)

( * ) Notice: Subject to any disclaimer, the term of this patent is extended or adjusted under 35 U.S.C. 154(b) by 237 days.

(21) Appl. No.: 13/119,588

(22) PCT Filed: Sep. 17, 2009

(86) PCT No.: PCT/EP2009/062074
§ 371 (c)(1), (2), (4) Date: Mar. 17, 2011

(87) PCT Pub. No.: WO2010/037640
PCT Pub. Date: Apr. 8, 2010

(65) Prior Publication Data
US 2011/0171503 A1    Jul. 14, 2011

(30) Foreign Application Priority Data

Sep. 30, 2008 (FR) ..................... 08 05380

(51) Int. Cl.
*H01M 10/44* (2006.01)
(52) U.S. Cl.
USPC ............................................. 429/50; 429/52
(58) Field of Classification Search
USPC ................. 29/623.5; 429/50, 51, 52
See application file for complete search history.

(56) References Cited

U.S. PATENT DOCUMENTS

| | | | |
|---|---|---|---|
| 1,376,923 A | | 5/1921 | Dean |
| 1,823,448 A | * | 9/1931 | Hebbeler ................ 429/95 |
| 3,708,345 A | * | 1/1973 | Loos et al. ................ 429/406 |
| 4,061,163 A | | 12/1977 | Decker et al. |
| 4,695,519 A | | 9/1987 | Rao et al. |
| 5,558,947 A | * | 9/1996 | Robison ................ 429/404 |
| 5,849,431 A | | 12/1998 | Kita et al. |
| 6,387,561 B1 | | 5/2002 | Nemoto et al. |
| 6,588,460 B1 | | 7/2003 | Wipperfurth et al. |
| 2003/0064280 A1 | * | 4/2003 | Morizane ................ 429/80 |

FOREIGN PATENT DOCUMENTS

| | | |
|---|---|---|
| EP | 0 994 519 A2 | 4/2000 |
| GB | 200731 | 7/1928 |
| GB | 295516 | 8/1928 |
| JP | A-60-246557 | 12/1985 |

OTHER PUBLICATIONS

International Search Report issued in International Application No. PCT/EP2009/062074, dated Nov. 11, 2009.

* cited by examiner

*Primary Examiner* — Ula C Ruddock
*Assistant Examiner* — Scott J Chmielecki
(74) *Attorney, Agent, or Firm* — Oliff & Berridge, PLC

(57) ABSTRACT

The liquid electrolyte storage battery includes a battery case consisting of a top wall, a bottom wall and a side wall delineating a cavity. The top wall includes an electrolyte injection hole. The battery case also includes a lateral hole formed in a bottom area of the side wall and defining a tank area for a liquid electrolyte solution. The tank area is delineated by the bottom wall, the side wall and a plane parallel to the bottom wall and passing via the lower edge of the lateral hole.

6 Claims, 5 Drawing Sheets

LIQUID ELECTROLYTE STORAGE BATTERY AND METHOD FOR FILLING

BACKGROUND OF THE INVENTION

The invention relates to a liquid electrolyte storage battery comprising a battery case formed by a top wall, a bottom wall and a side wall delineating a cavity, the top wall comprising a hole for injecting electrolyte.

Another object of the invention relates to a method for filling one such liquid electrolyte storage battery.

STATE OF THE ART

Storage batteries are in general formed by a positive electrode, a negative electrode and an electrolyte solution. In order to increase their performance, the electrodes are generally assembled in the form of an electrode body composed of a stack of positive and negative electrodes, a separator being placed between each positive and negative electrode. This body is arranged inside a storage battery and impregnated with an electrolyte solution necessary for the electrochemical reaction. Poor impregnation of the constituents, i.e. an impregnation that is not performed over the whole of the surfaces of the electrodes and of the separators, or that is inhomogeneous, may lead to a large downturn in performances of the storage battery which may amount to 50% of their capacity.

The documents GB-A-200731 and U.S. Pat. No. 1,823,448 describe a storage battery case comprising means for draining the electrolyte enabling the sediments accumulated in the battery to be eliminated when the electrolyte is replaced. The draining means comprise a lateral drainage hole, the lower edge of which hole is in contact with the bottom wall forming the bottom base of the battery.

In the case of a lithium-ion storage battery, the electrolyte solution used is a liquid solution obtained by dissolving a lithium salt (Li) forming Li ions in an organic solvent mixture. Organic solvents are however very volatile and flammable, which increases the risks of leakage of the storage batteries. New ionic liquid-base electrolytes have recently been developed to reduce the risks of fire and explosion. These ionic electrolyte solutions do however present a higher viscosity. Impregnation of the positive and negative electrodes is then more difficult on account of the low wettability of the ionic solvent.

In conventional manner, the lithium-ion storage batteries to be filled are placed in a depression chamber. The case is then filled by injecting the liquid electrolyte solution through a hole situated on the cover of the storage battery case.

Other filling methods have also been developed to improve the performances of storage batteries. More particularly, the document U.S. Pat. No. 6,387,561 B describes a method for filling a lithium secondary battery structure with a non-aqueous electrolyte solution. The electrode body is formed by winding positive electrodes and negative electrodes, sandwiched between a separator, around a central core. The method comprises injection of a predetermined quantity of organic electrolyte solution into the case via a hole passing through the central core so as to immerse the electrode body. The excess electrolyte solution is then extracted. The electrolyte solution is injected and extracted by means of a nozzle. In the case of a battery of large size, this method requires large quantities of electrolyte solution. Furthermore, in the case of an ionic electrolyte solution with a low wettability, the contact made by the electrolyte solution with the electrode layers is not sufficient to impregnate the latter.

Likewise, the document U.S. Pat. No. 5,849,431 discloses a method for filling a lithium secondary battery with a non-aqueous electrolyte solution. The battery is connected to an external tank containing the non-aqueous electrolyte solution and to a vacuum pump. The method comprises creation of a vacuum inside the case and, due to the pressure difference between the tank and the battery case, migration of the solution takes place into the case. This operation is performed several times to fill the case. These successive operations increase the risks of leakage of the solution when the latter is transferred from the tank to the inside of the case and also when the vacuum is created inside the battery case, more particularly, for very volatile and flammable organic electrolyte solutions. This filling method also over-consumes the electrolyte solution.

OBJECT OF THE INVENTION

The object of the invention is to propose a liquid electrolyte storage battery and a method for filling such a storage battery with a liquid electrolyte solution remedying the shortcomings of the prior art.

In particular the object of the invention is to propose a liquid electrolyte storage battery and a filling method thereof that are suitable for storage batteries of large dimensions and for any type of liquid electrolyte solution, in particular ionic solutions. A further object of the invention is to provide a method that is simple, easy to implement, inexpensive, presents low leakage risks and improves the mass and volume energy performances of storage batteries.

According to the invention, this object is achieved by a liquid electrolyte storage battery according to the appended claims.

More particularly, this object is achieved by the fact that a lateral hole is formed in a bottom area of the side wall of the battery case and by the fact that a tank area is delineated by the bottom wall, the side wall and a plane (A) parallel to the bottom wall and passing via the lower edge of the lateral hole.

The storage battery is advantageously a lithium-ion storage battery.

The invention also relates to a method for filling such a liquid electrolyte storage battery successively comprising:
  closing the electrolyte injection hole off by means of a sealing cap,
  actuating a vacuum pump connected to the lateral hole until the pressure inside the cavity reaches a predetermined value lower than atmospheric pressure,
  closing the lateral hole,
  a first injection of a first predetermined quantity of liquid electrolyte solution through the sealing cap,
  after a predetermined time, connection of the lateral hole at atmospheric pressure,
  a second injection of a second quantity of liquid electrolyte solution through the sealing cap to at least partially fill the tank area of the battery case situated above the lateral hole with liquid electrolyte and,
  sealing off definitively the electrolyte injection hole and the lateral hole.

The filling method is advantageously used for lithium-ion storage batteries.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR
EMBODIMENTS OF THE INVENTION

Figure 1:
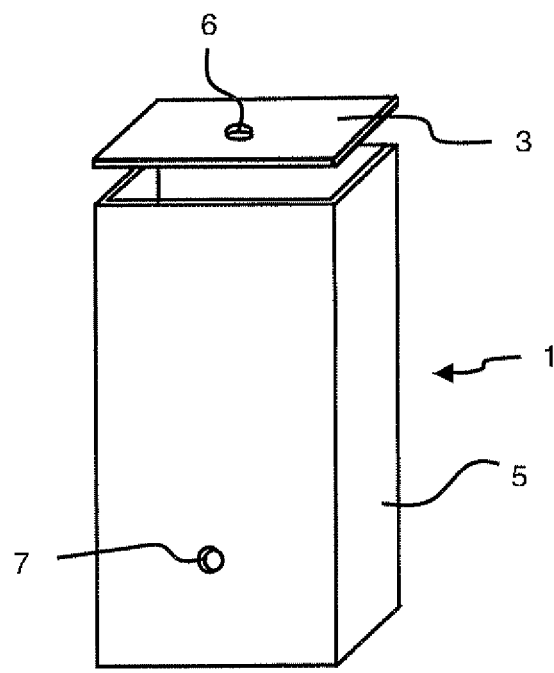
FIG. 1 represents a perspective view of a liquid electrolyte storage battery.
Figure 2:
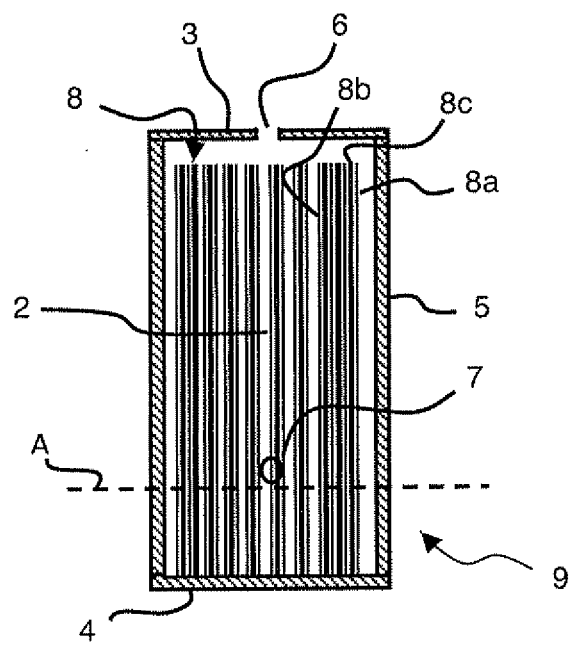
FIG. 2 is a schematic cross-sectional representation of a liquid electrolyte storage battery.

According to a particular embodiment, a liquid electrolyte lithium-ion storage battery, illustrated for example purposes in FIGS. 1 and 2, comprises a battery case 1 consisting of a top wall 3, a bottom wall 4 and a side wall 5 delineating a cavity 2. The battery case 1 is advantageously a case of large size having a volume of cavity 2 larger than 100 cm$^3$. Battery case 1 comprises two holes, an electrolyte injection hole 6 in top wall 3 (at the top of FIGS. 1 and 2) and a lateral hole 7 formed in a bottom area of side wall 5 (at the bottom of FIGS. 1 and 2). What is meant by bottom area is the part of the storage battery situated under the mid-line separating the top part of battery case 1 in half from the bottom part of battery case 1.

As illustrated in FIG. 2, cavity 2 contains an electrode body 8 which can for example be constituted by winding of alternately positive and negative electrodes, 8a and 8b, insulated from one another by a separator 8c. Electrode body 8 is located close to side wall 5 and its bottom part rests on bottom wall 4. Positive electrode 8a is preferably lithiated transition metal oxide-based, supported by an aluminum foil (not shown), and negative electrode 8b is carbonaceous material-based, supported by a copper foil (not shown). The pairs of positive and negative electrodes 8a and 8b used can for example be selected from $LiNiCoAlO_2/LiC_6$, $LiFePO_4/LiC_6$ or $LiFePO_4/Li_4Ti_5O_{12}$.

Separator 8c can be a microporous polyethylene or polypropylene film. During operation of a lithium-ion storage battery, the electrochemical reactions responsible for charging and discharging of the battery take place at the level of the electrodes only in the presence of a liquid electrolyte solution. The liquid electrolyte solution is the seat of ionic exchanges and conveys these ions through separator 8c. The performance of the storage battery, more particularly the mass and volume energy density, will therefore depend partly on the quality of impregnation of electrode body 8. Partial impregnation does in fact have the consequence of limiting the power performances of lithium-ion storage batteries. The liquid electrolyte solution is obtained by dissolving an electrolyte forming lithium ions, generally a lithium salt, either in an organic solvent or in an ionic liquid. Compared with organic solvents, as they are organic salts, ionic liquids present the advantage of being non-flammable, non-volatile and very stable. The ionic solutes used are for example lithium fluoride complex salts such as lithium hexafluorophosphate ($LiPF_6$) or lithium bis(trifluoromethane sulfone)imide (LiTFSI), in solution in an ionic liquid composed of an imididazomium, piperidinium or pyrrolidinium cation. The following can for example be used:

as imidazolium cation, 1-butyl-3-methylimidazolium tetrafluoroborate, or 1-butyl-3-methylimidazolium bis(trifluoromethanesulfonyl)imidide, as piperidinium cation, N,N-propyl-methyl piperidinium bis(trifluoromethane sulfonyl)imidide ($PP_{13}TFSI$) and, as pyrrolidinium cation, N,N-propyl-methylpyrrolidinium bis(trifluoromethane sulfonyl)imidide.

Battery case 1 comprises a tank area 9 at the bottom part of the battery case (at the bottom in FIGS. 1 and 2) designed to receive a predefined quantity of liquid electrolyte solution. This tank area 9 is delineated by bottom wall 4, side wall 5 and a plane A parallel to bottom wall 4 passing via the lower edge of lateral hole 7. This tank area 9 is dimensioned to be able to contain between 5% and 25% of the total volume of battery case 1, preferably 10%. Lateral hole 7 is located so as to adjust the size of tank area 9 according to the external dimensions of battery case 1.

Figure 3:
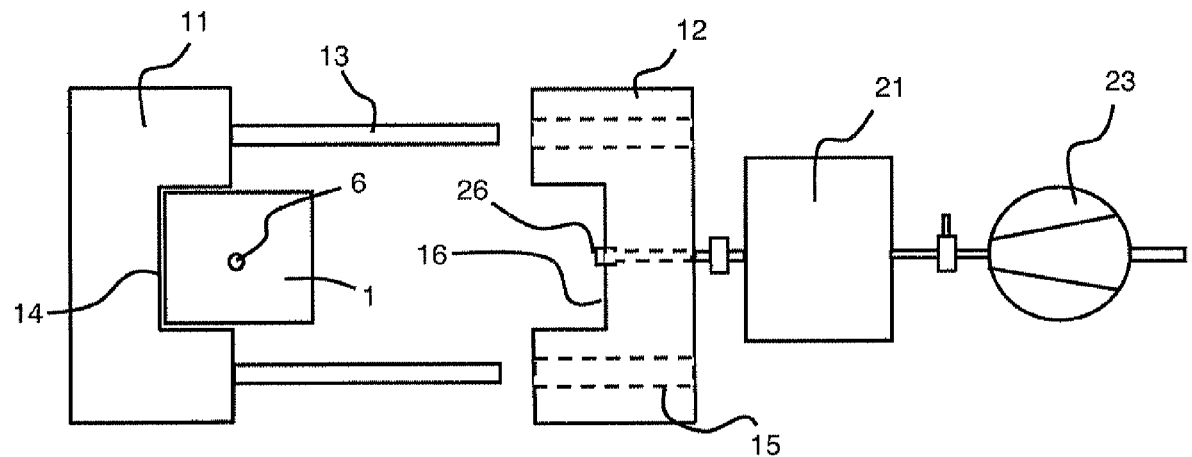
FIGS. 3 to 5 represent top views of a particular embodiment of a device for filling a storage battery according to FIGS. 1 and 2 in successive steps of a filling method according to the invention.
Figure 4:
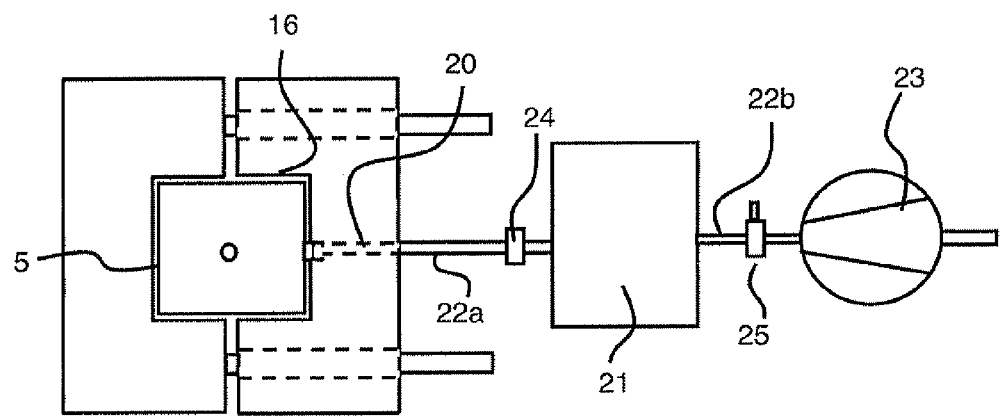

This liquid electrolyte storage battery is preferably filled with a liquid electrolyte solution according to a filling method described hereafter, advantageously by means of a device represented in FIGS. 3 to 10. According to a particular embodiment, the device comprises a fixed part 11 and a movable part 12 sliding along two slide rails 13 from an open position (FIG. 3) to a closed position (FIG. 4). In the open position, as represented in FIG. 3, battery case 1 is arranged in a first housing 14 having a complementary shape to at least a part of battery case 1. Movable part 12 is engaged in the two slide rails 13 by two guide bushings 15 and slides up to the closed position (FIG. 4). A second housing 16, situated on movable part 12, has a complementary shape to at least a part of battery case 1 so that, once movable part 12 has come up against the stop formed by fixed part 11, battery case 1 is secured in place.

Figure 6:
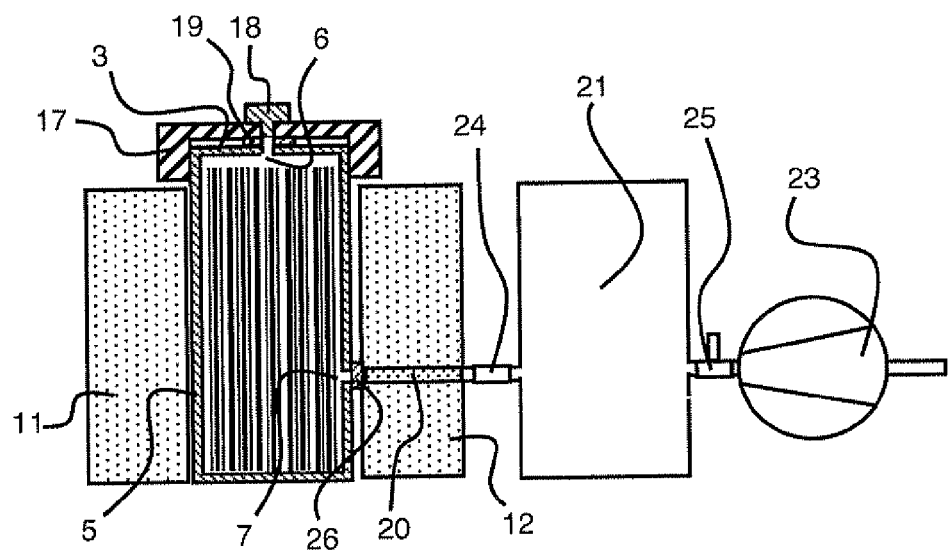
FIGS. 6 to 10 represent the subsequent steps of the filling method, schematically in cross-section along the line BB.

The top part of battery case 1 (at the top in FIG. 6) then extends beyond the two joined fixed and movable parts 11 and 12. As represented in FIG. 6, a cover 17 having a complementary shape to this top part can then be arranged on the top part of battery case 1 so as to cover top wall 3. Fixed and movable parts 11 and 12 and cover 17, in the closed position, form a housing of complementary shape to battery case 1 and secure the battery case 1 fixedly. Cover 17 comprises a central hole blanked off by a sealing cap 18.

In an alternative embodiment that is not represented, fixed and movable parts 11 and 12 can, with cover 17, form a monoblock assembly which fits onto battery case 1.

Figure 5:
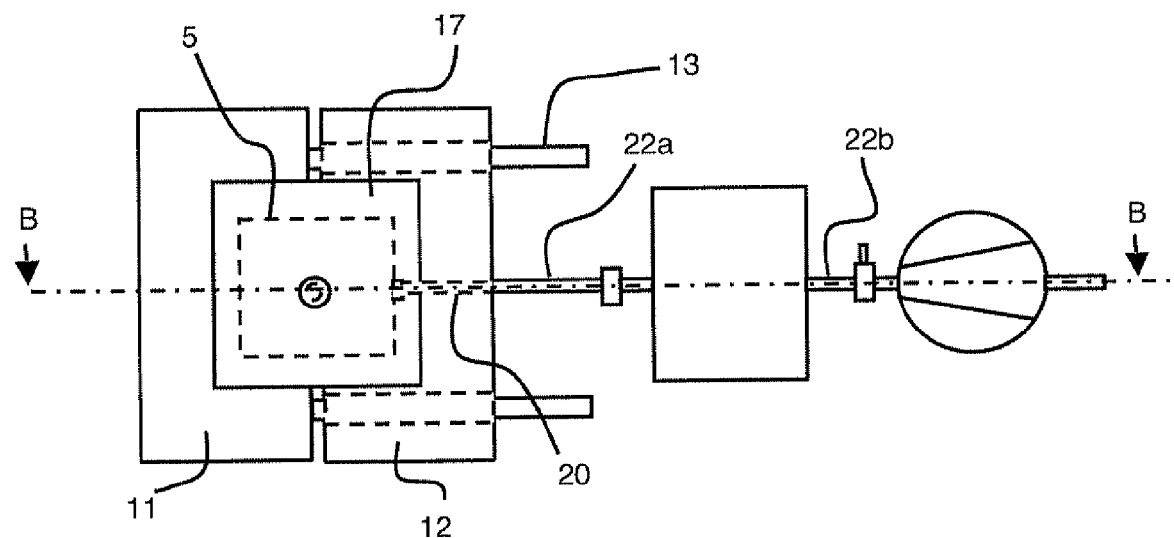
Figure 7:
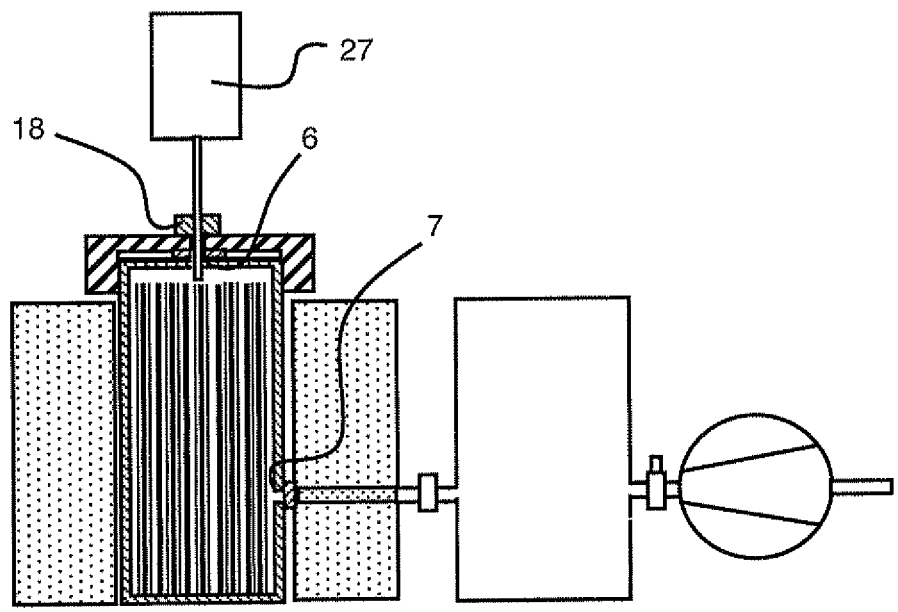

As represented in FIGS. 5 and 6, electrolyte injection hole 6 is positioned at the top of the device (at the top of FIG. 6), facing sealing cap 18. Sealing cap 18 is airtight and is preferably made from deformable material, for example from silicone. A first sealing gasket 19 is fitted between cover 17 and top wall 3. Sealing cap 18 associated with first sealing gasket 19 enables electrolyte injection hole 6 to be sealed off tightly. A needle 27 can however penetrate into cavity 2 of battery case 1 through sealing cap 18 and electrolyte injection hole 6 (FIG. 7).

Lateral hole 7 is located in the axis of pass-through hole 20 of movable part 12, opening out on one side in the second housing 16 and on the other side onto the outside of the device (FIG. 4).

Electrolyte injection hole 6 and lateral hole 7 are of small dimensions, advantageously circular, and have a diameter smaller than or equal to 2 mm to reduce risks of leakage when the different filling operations are performed, and also after filling once they have been closed off and sealed.

A tank 21 is connected in tight manner via a first duct 22a to pass-through hole 20, and via a second duct 22b to a vacuum pump 23. First and second ducts, 22a and 22b, are respectively equipped with a two-way valve 24 and a three-way valve 25 enabling the vacuum to be created or broken.

Valve 24 also serves the purpose of actuating opening and closing of the passage of the liquid electrolyte solution to tank 21. Tank 21 enables the liquid electrolyte solution to be trapped by any known method, for example by cooling. Valve 25 can also be connected to an inlet of inert gas, for example nitrogen or argon, to drain cavity 2. A second sealing gasket 26 is fitted between side wall 5 of battery case 1 and the inner wall of second housing 16, around lateral hole 7 (FIG. 6).

Thus, as represented in FIG. 7, when valve 24 of first duct 22a is closed, lateral hole 7 is tightly closed. First and second sealing gaskets, 19 and 26, are advantageously gaskets resistant to the liquid electrolyte solution, for example made from rubber of "Viton" gasket type.

According to an alternative embodiment, fixed and movable parts, 11 and 12, and cover 17 can be controlled automatically by automatic control means, not illustrated, and be managed by a logic system. Valves 24 and 25 can be electromechanical valves actuated by a programmable logic controller.

As illustrated in FIG. 6, battery case 1 is secured in its housing by fixed and movable parts 11 and 12 and cover 17. Electrolyte injection hole 6 is then closed by sealing cap 18. Vacuum pump 23 is then actuated whereas valve 24 is open and valve 25 is set to a first open position in which tank 21 is connected to vacuum pump 23. A vacuum pressure is thereby created in cavity 2 of battery case 1. Vacuum pump 23 is stopped when the pressure reaches a predetermined value less than atmospheric pressure. This pressure is advantageously comprised between 100 and 300 mbar, preferably equal to 200 mbar. This pressure is defined according to the vapour pressure of the electrolyte solution.

As represented in FIG. 7, valves 24 and 25 are then closed. Lateral hole 7 is then tightly closed. A first predetermined quantity of liquid electrolyte solution is then injected through sealing cap 18, via electrolyte injection hole 6, preferably by means of a needle 27. The use of a needle 27 is advantageous as it allows easy administering of the exact quantity of liquid to be injected. Needle 27 pierces sealing cap 18 while at the same time maintaining the pressure within cavity 2 below atmospheric pressure. Under the effect of the vacuum pressure, the liquid electrolyte solution vaporizes and penetrates efficiently into electrode body 8. Vaporization enhances penetration of the ionic liquid electrolyte into the pores of electrodes, 8a and 8b, and of separators 8c. Impregnation then takes place in homogeneous manner in the external electrode layers but also in the internal layers of electrode body 8. Vaporization of the liquid electrolyte re-establishes atmospheric pressure in cavity 2. The quantity of liquid electrolyte solution injected depends on the volume of battery case 1. Almost all of the injected liquid is advantageously vaporized. Vacuum pressure enhances impregnation by improving vaporization for a solvent-based liquid electrolyte or diffusion for an ionic liquid electrolyte.

Figure 8:
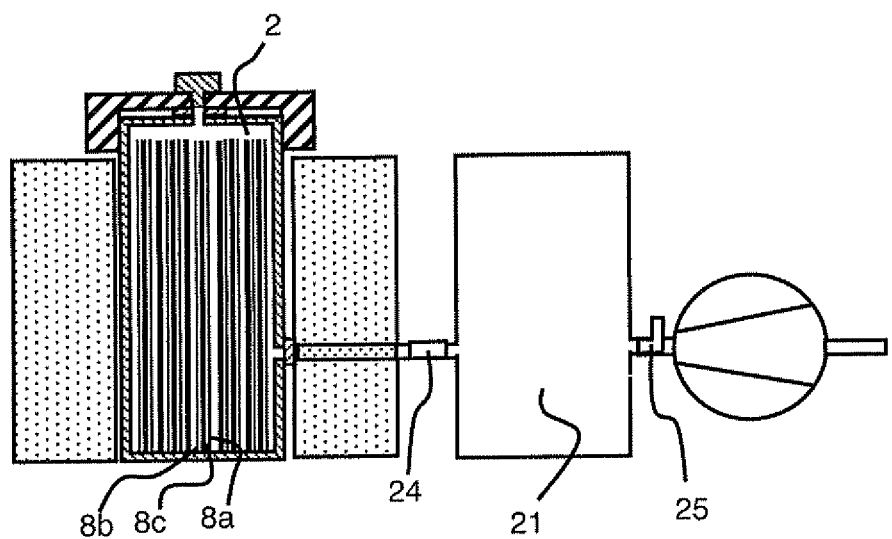
Figure 9:
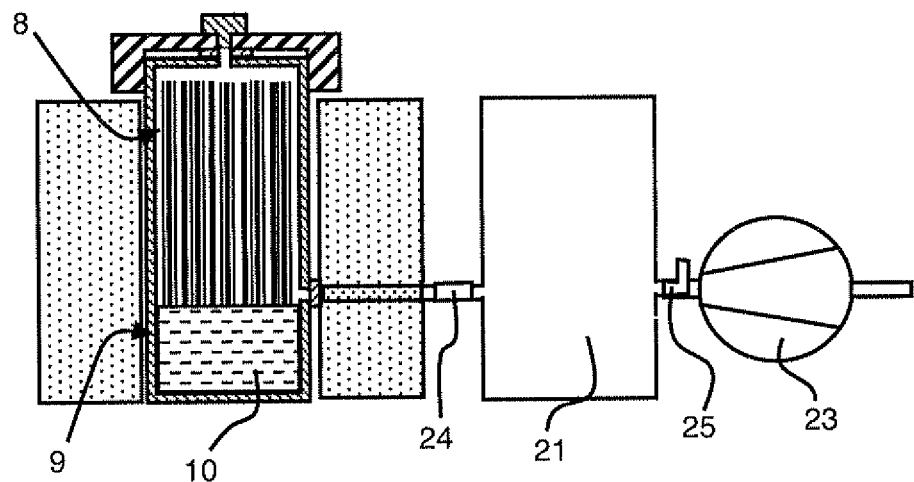

After a predetermined time, comprised for example between 2 min and 30 min, necessary for impregnation of electrode layers 8a and 8b and of separators 8c, the pressure of tank 21 is increased to atmospheric pressure by switching the position of valve 25. Tank 21 is then made to communicate with cavity 2 by opening of valve 24 (FIG. 8). Lateral hole 7 is then connected to atmospheric pressure resulting in cavity 2 being at atmospheric pressure.

A second quantity of liquid electrolyte solution is injected via electrolyte injection hole 6 through sealing cap 18 in identical manner to the first injection. The liquid electrolyte solution then flows to tank area 9 situated below lateral hole 7, which fills progressively. The volume delineated by tank area 9 corresponds to the maximum volume necessary for impregnation of electrode body 8. The bottom part of electrode body 8 (at the bottom of FIG. 9) is immersed in liquid electrolyte solution 10. Electrolyte solution 10 then migrates into electrode body 8 by capillarity and continues impregnation. The first impregnation of the vaporized electrolyte solution enhances reduction of the interactions between liquid electrolyte solution 10 and the walls of electrodes 8a and 8b and of separators 8c. Migration of electrolyte solution 10 then takes place more easily inside electrode body 8. This effect is particularly marked for ionic liquid electrolyte solutions, which are viscous and of low wettability.

This method is particularly advantageous for liquid electrolyte solutions having a viscosity or more than 100 centipoise (cP), i.e. 0.1 Pa·s, or for liquid electrolyte solutions presenting a contact angle with electrode body 8 comprised between 35° and 70°.

For example purposes, for filling a lithium-ion storage battery containing a graphite/phosphate electrochemical couple with an ionic liquid electrolyte solution $PP_{13}TFSI$ comprising LiTFSI with a concentration of 1.6 mol·l$^{-1}$ with 5% volume of vinyl ethylene carbonate and a 100 cm$^3$ battery case: 30 cm$^3$ of a first quantity of ionic liquid electrolyte solution is injected. After 15 min, a second quantity of 10 cm$^3$ of ionic liquid electrolyte solution is injected at atmospheric pressure. According to this filling method, storage battery case 1 is filled in about 15 min.

Advantageously, the first quantity of liquid electrolyte solution corresponds to a value comprised between 45% and 95%, preferably 75%, of the total quantity of liquid electrolyte solution 10 injected.

According to an alternative embodiment (FIG. 10), the first and second injections of liquid electrolyte solution 10 partially fill tank area 9.

According to another alternative embodiment, when the first injection is made, the quantity of liquid electrolyte solution injected is only partly vaporized. The non-vaporized liquid is then collected in tank area 9 and partially fills the tank area 9. The second injection of electrolyte solution then completes tank area 9.

When the volume of the second quantity of liquid electrolyte solution is greater than the volume of tank area 9, the excess liquid electrolyte solution injected is evacuated via lateral hole 7 (on the right of FIG. 9) toward tank 21.

Figure 10:
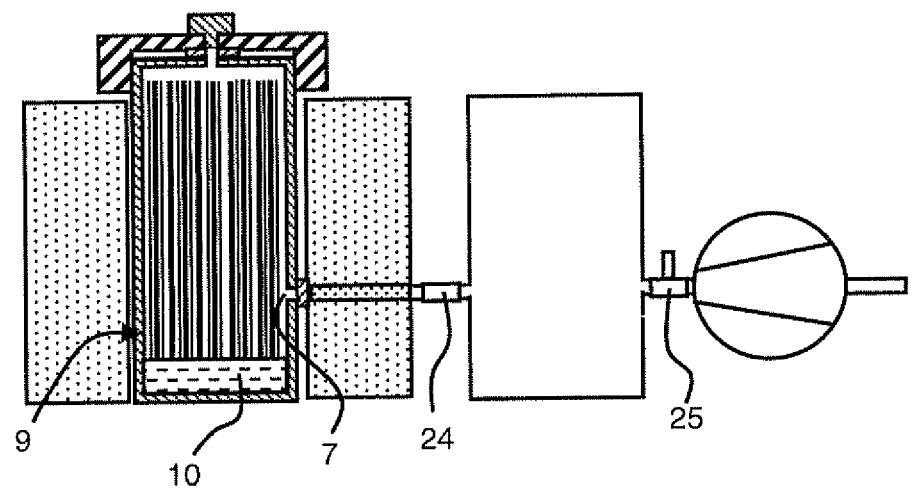

After a predetermined time necessary for migration of the solution within electrode body 8, the excess liquid electrolyte solution can advantageously be eliminated by again placing cavity 2 in a vacuum by switching the position of valves 24 and 25 (FIG. 10).

The quality of impregnation enhances the ionic exchange even in the inner layers of electrode stack 8a and 8b, and has the effect of achieving stability of the storage battery performances.

Electrolyte injection hole 6 and lateral hole 7 are then sealed off tightly and definitively by means of any known method.

As an alternative embodiment, the filling method can comprise more than two successive injections of liquid electrolyte solution.

According to another alternative embodiment, in the case of an ionic liquid electrolyte solution, which is very viscous, creation of the vacuum pressure in battery case 1 and the first injection of liquid electrolyte solution can be performed at the same time. Due to the vacuum pressure, migration of the liquid electrolyte solution is thus enhanced.

The filling method described in the foregoing enables storage batteries, preferably of large size, to be impregnated by means of a simple, inexpensive and quick method. To implement the method, it is in fact not necessary to use a device comprising a depression chamber, as only cavity 2 of the storage battery is placed in a vacuum. The quantity of liquid electrolyte solution injected can be predefined so as to be limited only to the necessary volume. The volumes of electrolyte solution and of inert gas necessary for filling storage battery cases are consequently much smaller than in conventional methods. The filling cost and time are thereby reduced.

The liquid electrolyte storage battery and the method of the present invention are particularly suitable for lithium-ion storage batteries using non-volatile and non-flammable liquid ionic electrolyte solutions. They enable leakage risks to be minimized and reliable, secured storage batteries to be obtained, while at the same time maintaining high performances.

The invention claimed is:

1. A method for filling a storage battery comprising a battery case consisting of a top wall, a bottom wall and a side wall delineating a cavity, an electrolyte injection hole, and a lateral hole formed a bottom area of the side wall, wherein:
 a tank area is delineated by the bottom wall, the side wall and a plane (A) parallel to the bottom wall and passing via the lower edge of the lateral hole, and
 the cavity contains an electrode body, at least a bottom part of the electrode body is located in the tank area for allowing impregnation of the electrolyte body with a liquid electrolyte when the tank area contains the liquid electrolyte, the method comprising:
 closing the electrolyte injection hole off by means of a sealing cap,
 actuating a vacuum pump connected to the lateral hole until a pressure inside the cavity reaches a predetermined value lower than atmospheric pressure,
 closing the lateral hole,
 a first injection of a first predetermined quantity of liquid electrolyte solution through the sealing cap,
 after a predetermined time, connection of the lateral hole to atmospheric pressure,
 a second injection of a second quantity of liquid electrolyte solution through the sealing cap to at least partially fill the tank area of the battery case situated below the lateral hole with liquid electrolyte and,
 sealing off definitively the electrolyte injection hole and the lateral hole.

2. The filling method according to claim 1, wherein the liquid electrolyte solution has a viscosity of more than 0.1 Pa.s.

3. The filling method according to claim 1, wherein the cavity containing an electrode body, the liquid electrolyte solution presents a contact angle with the electrode body comprised between 35° and 70°.

4. The filling method according to claim 1, wherein the pressure inside the cavity is comprised between 100 and 300 mbar.

5. The filling method according to claim 4, wherein the pressure inside the cavity is equal to 200 mbar.

6. The filling method according to claim 1, wherein the first and second injections are performed by means of a needle through the sealing cap made from deformable material.

* * * * *